No. 867,074. PATENTED SEPT. 24, 1907.
D. M. PEARCE.
SEED PLANTER.
APPLICATION FILED DEC. 8, 1906.
5 SHEETS—SHEET 1.
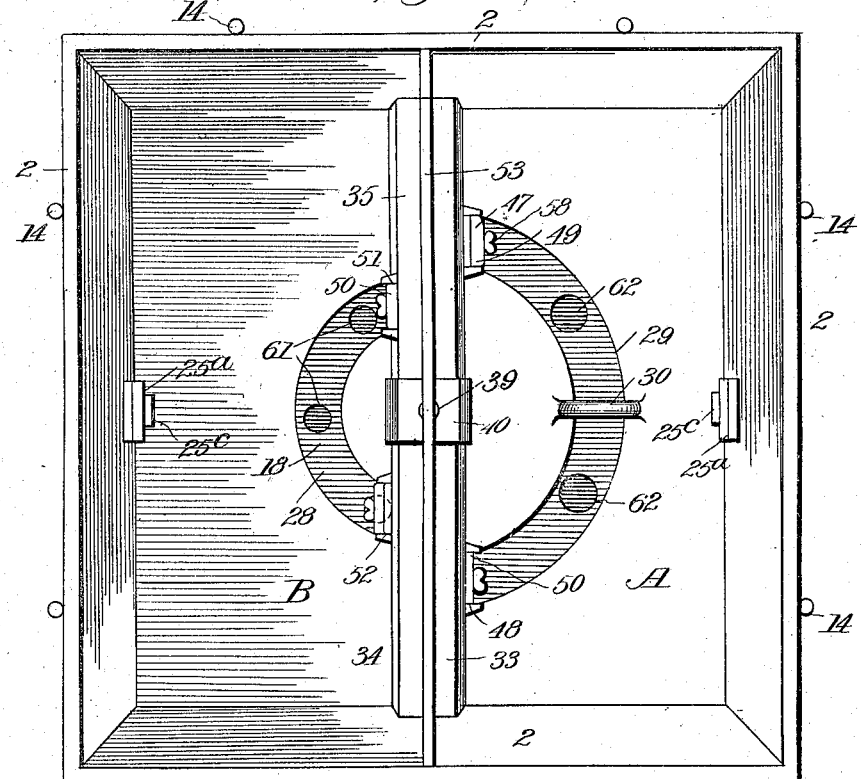
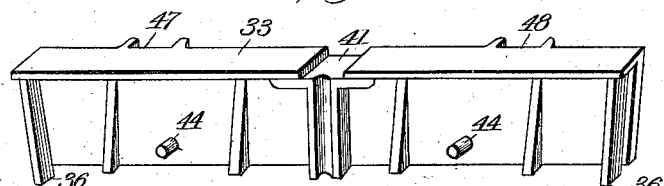
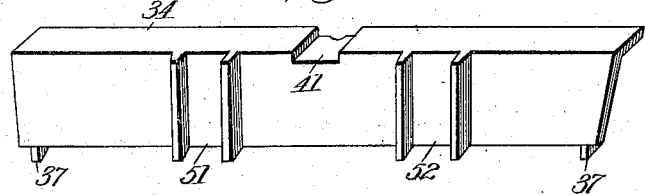
Witnesses
C. N. Walker,
F. J. Veihmeyer.
Inventor
David M. Pearce,
By Edson Bro's,
Attorneys No. 867,074.  
PATENTED SEPT. 24, 1907.  
D. M. PEARCE.  
SEED PLANTER.  
APPLICATION FILED DEC. 8, 1906.

5 SHEETS—SHEET 2.

Witnesses  
C. H. Walker  
F. J. Veihmeyer

Inventor  
David M. Pearce,  
By Edson Bros.  
Attorneys

No. 867,074. PATENTED SEPT. 24, 1907.
D. M. PEARCE.
SEED PLANTER.
APPLICATION FILED DEC. 8, 1906.
5 SHEETS—SHEET 3.
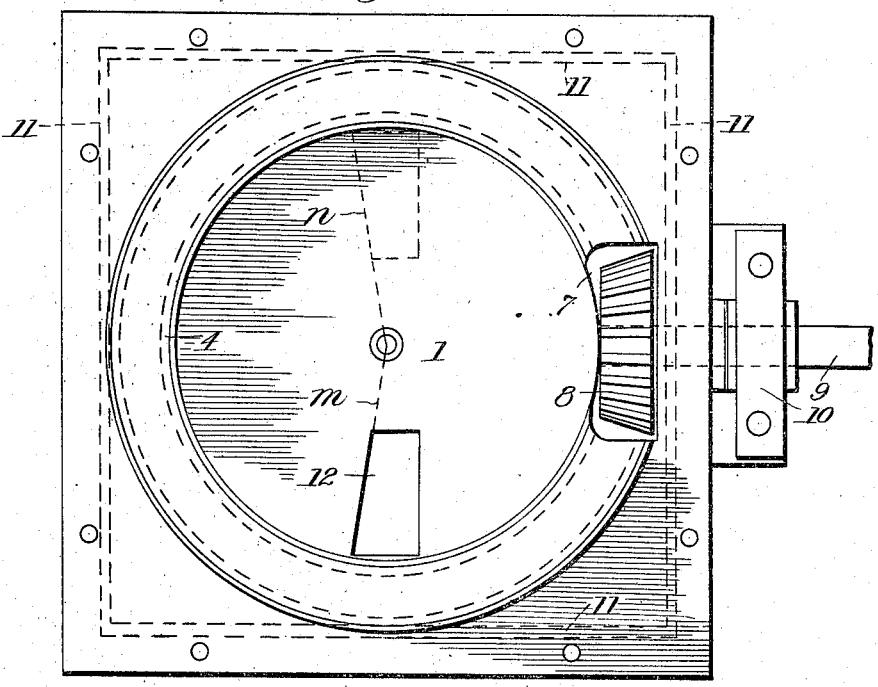
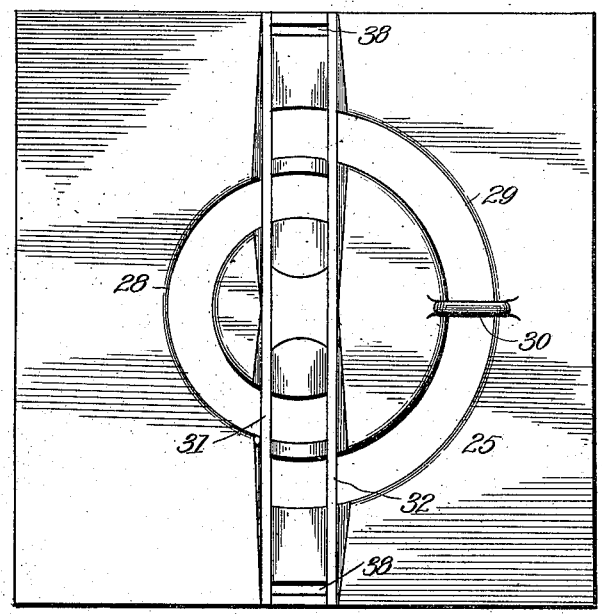

No. 867,074.　　　　　　　　　　　　　　PATENTED SEPT. 24, 1907.
D. M. PEARCE.
SEED PLANTER.
APPLICATION FILED DEC. 8, 1906.

5 SHEETS—SHEET 4.

Fig. 7ᵃ

Witnesses
C. H. Walker.
F. J. Veihmeyer.

Inventor
David M. Pearce,
By Edson Bros.
Attorneys

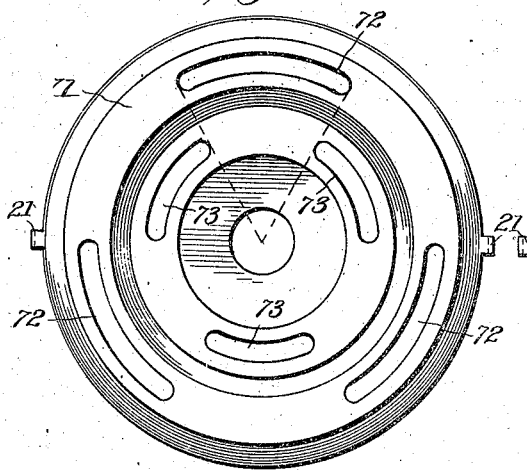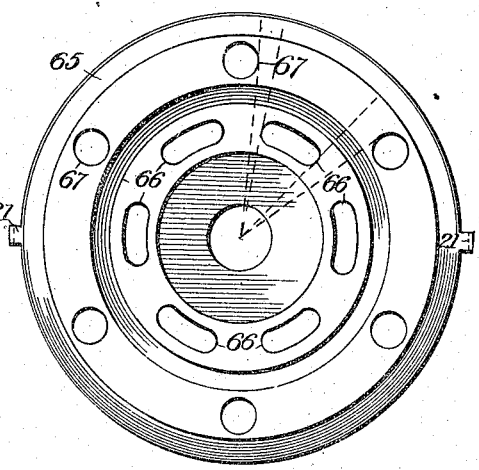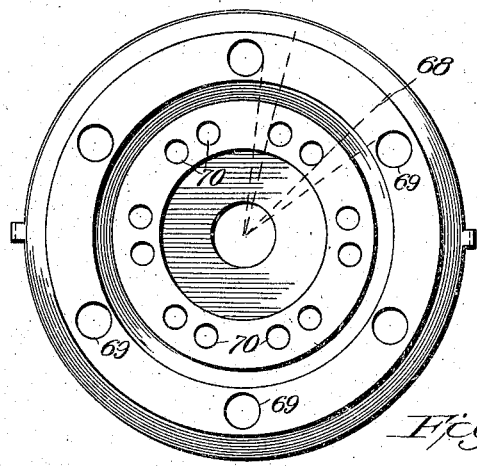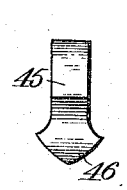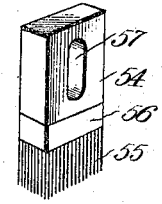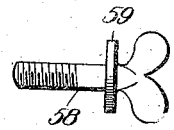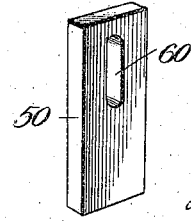

UNITED STATES PATENT OFFICE.

DAVID M. PEARCE, OF UNION CITY, TENNESSEE.

SEED-PLANTER.

No. 867,074.  Specification of Letters Patent.  Patented Sept. 24, 1907.

Application filed December 8, 1906. Serial No. 346,887.

*To all whom it may concern:*

Be it known that I, DAVID M. PEARCE, a citizen of the United States, residing at Union City, in the county of Obion and State of Tennessee, have invented certain new and useful Improvements in Seed-Planters; and I do hereby declare the following to be a full, clear, and exact description of the invention, such as will enable others skilled in the art to which it appertains to make and use the same.
My invention relates to improvements in seed planters.

It has for its object to provide a practical planter adapted to sow two kinds of seed alternately or at the same time and either continuously or in hills.
The invention is designed as an improvement of the planter shown and described in U. S. Patent No. 823,358 issued to me on June 12, 1906, and it consists of the features of construction and combinations of parts hereinafter described and more particularly pointed out in the claims.

Figure 2:
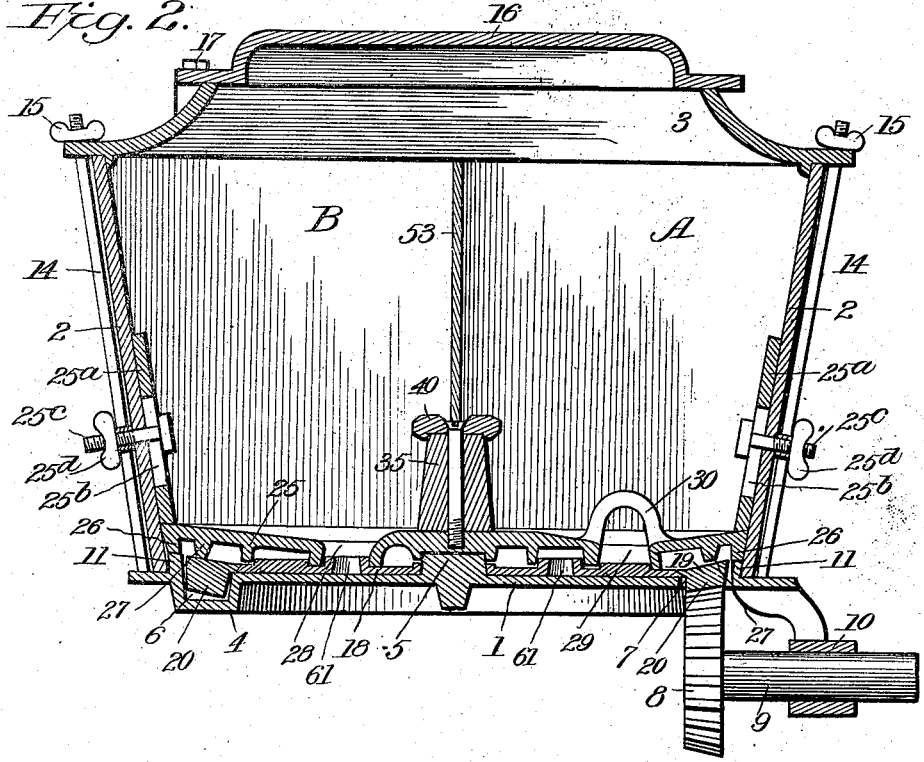
Figure 3:
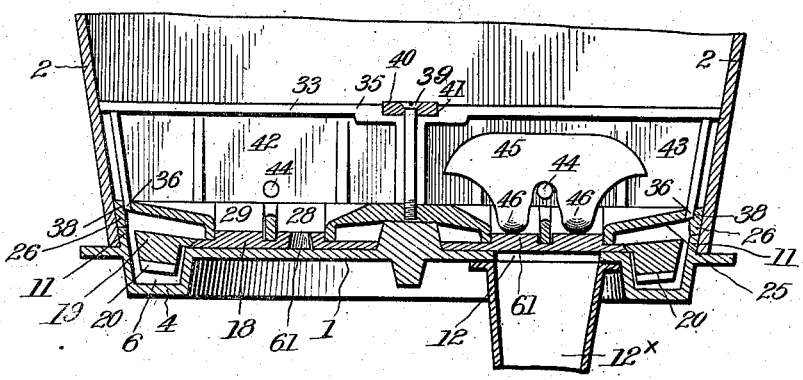
Figure 6:
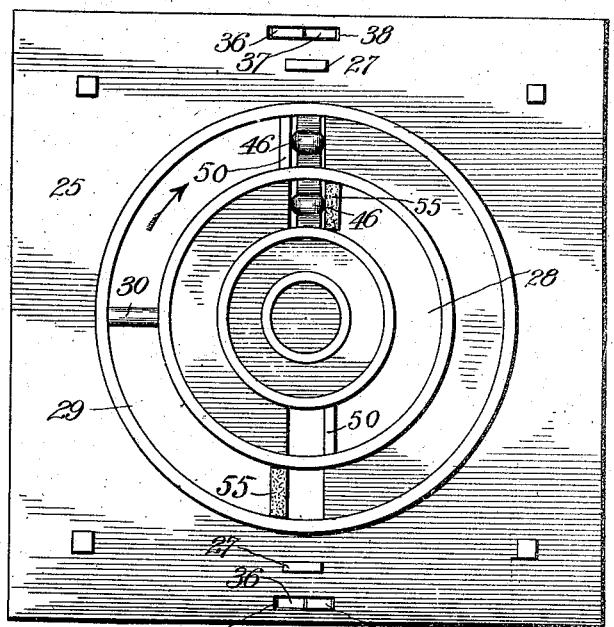
Figure 7:
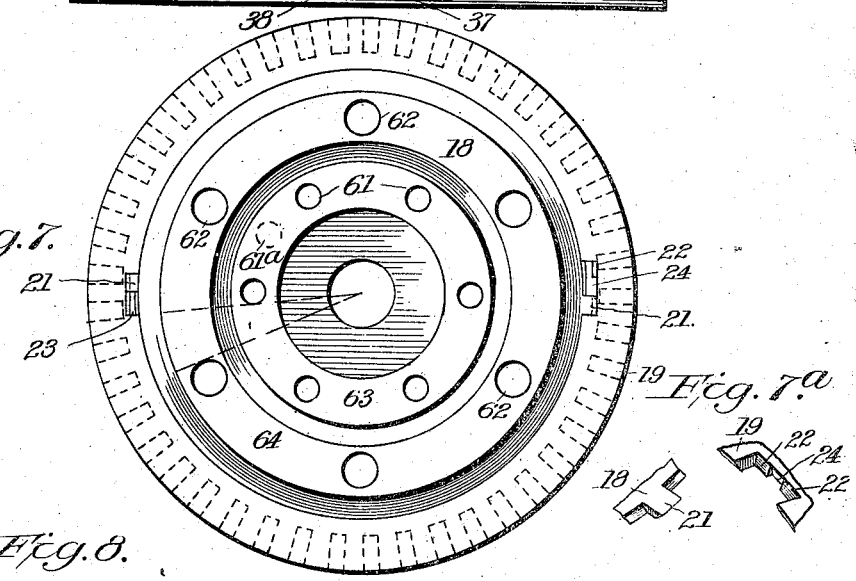
Figure 8:

In the accompanying drawings, illustrating the preferred embodiment of my invention: Figure 1 is a plan view of a seed hopper equipped with my invention, the top or closure for said hopper being removed. Fig. 2 is a central vertical sectional view of the seed hopper taken at right angles to the bridge, the cover or closure being shown. Fig. 3 is a broken central vertical sectional view through the hopper in line with the bridge. Fig. 4 is an under plan view of the hopper. Fig. 5 is a plan view of the cover plate before the bridge is put in place. Fig. 6 is an under plan view of said cover plate with the bridge in place, showing ends of the knockout. Fig. 7 is a plan view of the ring and one style of dropping plate for planting seed in hills. Fig. 7ª is a detailed view showing the construction of the locking device at the right hand side of Fig. 7. Fig. 8 is a central vertical sectional view illustrating different thicknesses of the perforated portions of the dropping plate in dotted lines. Fig. 9 is a plan view of a dropping plate for planting seed in continuous rows. Figs. 10 and 11 are plan views of other styles of dropping plates for planting seed in hills. Figs. 12 and 13 are detached perspective views of the halves of the bridge. Fig. 14 is an end view of the knock-out or seed ejector.
Fig. 15 is a detail view of one of the cut-offs. Fig. 16 is a detailed view of one of the back-fenders or scrapers, and Fig. 17 is a detailed view of the thumb screw used for securing said cut-offs and back-fenders in place.

Referring more particularly to the drawings, the seed hopper comprises a base plate 1, sides 2 and a cover or closure 3. The base-plate is formed with reinforcing diametric flange or rib 4 on its under surface and a central circular stud 5 on its upper surface. Said base plate is also provided with a circular groove or way 6 near its periphery. Said base plate has a slot 7 at the base of said groove and into said slot extends a gear 8 which is mounted on a shaft 9 having a bearing in a bracket 10 depending from said base plate. Said shaft may be connected up with a check row or any other suitable actuating device. Said base plate is further provided with an upstanding flange or rib 11 arranged parallel to, and a short distance within its outer edge. An opening or slot 12 is formed radially of said plate and is adapted to be placed immediately above the seed tube or the shank of the framework and runner (not shown) which conveys the seed into the ground. As shown by the dotted line *m* in Fig. 4, one edge of said slot or opening is on a radial line from the center of the base plate.

The sides 2 of the hopper are placed outside the flange or rib 11 and secured to the base plate and to each other in any suitable manner. The cover or closure 3 is retained in place by rods 14 connecting with the base plate and arranged just without the sides. Said rods are fitted with thumb nuts 15 on their ends where they engage slots in the cover. By this means said cover or closure may be readily removed after having loosened said thumb nuts and thrown said rods out of engagement with said slots. The cover may be provided with a swiveled door 16 connected thereto by a bolt 17.

A dropping plate 18 is mounted around the stud 5 as a journal and rests upon the base plate. Said dropping plate is arranged within the ring gear 19 which has gear teeth 20 extending into the groove 6 and meshing with the gear 8 at the slot 7. The periphery of said dropping plate is beveled downwardly and outwardly and the inner edge of the ring gear is correspondingly beveled upwardly and inwardly so that said dropping plate must be introduced from below into said ring gear. Said dropping plate is provided with oppositely extending lugs 21 having their ends beveled in the opposite direction from the periphery of said plate. The ring gear has notches 22 and 23 oppositely arranged and beveled to correspond to the ends of said lugs and in the opposite direction from the inner edge of said ring gear. (See Figs. 8 and 9.) The notch 22 is cut entirely through at the center as at 24. To place the dropping plate in the ring gear, one of the lugs is slipped into the notch 23 while said plate is inclined to the plane of said ring gear, after which the other lug is passed through the opening 24 as the plate and gear are brought into the same plane, whereupon said plate is turned slightly in either direction to bring the last mentioned lug into engagement with the beveled portion of the notch 22. By this means the dropping plate is effectively secured to the ring gear in such manner that it may be readily and quickly disengaged and removed when it is desired to substitute another style of plate. The dropping plate should not fit very tightly within the ring gear so that if the latter vibrates a little it will not interfere with the smooth running or movement of said plate. Said dropping plate is provided with two series of perforations therein arranged concentrically of one another as will be described later in detail.

A cover plate 25, conforming to the shape of the hopper, forms the inner bottom thereof, being placed over the dropping plate and ring gear. Said cover plate is supported in proper position by means of lugs 26 thereon resting upon the ribs 11 on the base plate. The under surface of said cover plate is also provided with lugs 27 for holding the ring gear down in proper place to be engaged by the driving gear. The cover plate is held down in place by lugs 25$^a$ having slots 25$^b$ through which pass bolts 25$^c$ also passed through the sides of the hopper and fitted with thumb nuts 25$^d$. Two semi-circular feed slots are formed in said cover plate, one, 28, in one half thereof arranged over the inner series of holes or perforations in the dropping plate and the other, 29, in the other half and arranged over the outer series of holes in said dropping plate. A yoke 30 extends over the slots 29 far enough above the cover plate to permit the seed to pass freely under it. Said yoke serves as a brace and also as a means of taking hold of said plate to lift it out. At the middle of said cover plate are two parallel ledges 31 and 32 forming seats for the parts or halves 33 and 34 of the bridge 35. Said halves of said bridge are held in place at the ends by lugs 36 on the half 33 and lugs 37 on the half 34, said lugs fitting into slots 38 in the cover plate. At the center, said bridge is secured by a bolt 39 carrying a flanged cap 40 embracing said halves and seated in a groove 41, said bolt being screwed into the cover plate. Said bridge is chambered at each side of its center, as at 42 and 43, and projecting into each of said chambers is a pin 44 upon which the knock-out or seed ejector 45 may be mounted. Said knock-out has two legs or projections 46 which straddle said pin as shown in Fig. 3. Each of the legs of said knock-out extends through end extensions of the slots 28 and 29 between the ledges 31 and 32 and are adapted to drop by gravity into the holes in the dropping plate as they pass below it, thus discharging the seed from said holes through the opening 12 in the base plate to the seed tube 12$^\times$, said knock-out being arranged over said opening. The knock-out is used in only one of the chambers of the bridge at a time and that one is determined by the position of said opening 12 which may be on one side or the other according as the hopper is used on the right or left hand side of the planter. In Fig. 4 the dotted lines $n$ indicate the position of the discharge opening when the hopper is used on the left hand side of the machine. When used on the right hand side, the knock-out is changed to the other end of the bridge and the dropping plate is revolved in the opposite direction. As shown in Fig. 14, the ends of the legs of the knock-out are beveled laterally whereby they will ride up at the ends of the holes in the dropping plate.

On the outer face of the part 33 (shown in Fig. 12) of the bridge are two grooves or seats 47 and 48, one positioned at each end of the slot 28. As shown in Fig. 1, the seat 47 is occupied by a cut-off 49 while the seat 48, contains a back-fender 50. These are the proper positions for said cut-off and back-fender when the dropping plate is turning in the direction of the arrow in Fig. 6. The part 34 (shown in Fig. 13) is similarly provided with grooves or seats 51 and 52, arranged at the ends of the slot 29. When the dropping plate is revolving in the direction indicated by the arrow, a cut-off is arranged in the seat 51 and a back fender in the seat 52. If the dropping plate is revolved in the opposite direction, the cut-offs and back-fenders should be interchanged. A partition 53 is placed upon the bridge and extends to the top of the hopper thereby dividing it into two compartments adapted to hold different kinds of seed. It is evident that the seed in each compartment will have access to the holes in the dropping plate which are uncovered by the slot in the cover plate. Each of the cut-offs as shown in Fig. 15, comprises a body portion 54, preferably of wood, and a stiff brush 55 secured by a metal band 56. A slot 57 is formed in the body portion and through said slot a thumb screw 58 is passed whereby said cut-off may be adjusted vertically so that the brush will always rest upon the surface of the dropping plate to prevent any of the seed, except that contained in the holes in said plate, from passing under the bridge. Said thumb screw is made with an integral washer 59 to prevent marring the wood at the sides of the slot. Each of the back-fenders is made preferably of leather, is provided with a slot 60 and is adjustably held by a thumb screw like those used with the cut-offs so as to prevent the seed from working back under the bridge when the dropping plate turns backward as it does when the machine is turned at the end of the row.

In Figs. 2, 3, and 8, I have shown one style of dropping plate 18 for sowing two kinds of seed in alternate hills, the holes 61 of the inner series being arranged intermediate of the holes 62 in the outer series. If it is desired to sow the two kinds of seed in the same hill, the holes of the two series are placed in line with one another as shown in dotted lines at 61$^a$ in Fig. 7. All of said holes are of such size that as said plate revolves there will be intervals between the passage of the holes in one series and those in the other. The amount of seed dropped in each hill may be regulated by the thickness of the portion of the plate in which said holes are formed as it is evident that the thicker the plate the larger will be the amount of seed which will be chambered therein. In Fig. 8 the portion 63 of the plate 18 in which the inner series of holes are made is much thicker than the body thereof and the portion 64 containing the outer series of holes is also thicker than the body but not as thick as the portion 63. These thicknesses may be varied to suit any requirements. The amount of seed dropped in each hill may be further regulated by varying the size of the openings or holes. This is illustrated in the dropping plate 65 shown in Fig. 10.

The dropping plate 65 in Fig. 10 has a series of slots 66 arranged within an outer series of circular holes 67. Said slots and holes are alternately placed. This plate will sow a row of one kind of seed through the slots of the inner series and alternately of said rows it will drop hills of another kind of seed through the outer series of holes. This style of plate is particularly useful for planting corn and beans in the same row. The length of the slots 66 may, of course, be varied to suit any requirements and as long as the radial angle determined by the length of one of said slots is less than the radial angle determined by two adjacent holes 67, the plate will sow the seed intermittently.

In Fig. 11, I have illustrated another style of intermittently dropping plate 68 wherein the outer series of holes 69 are formed like in Fig. 10 but the inner series of openings comprise smaller holes 70 arranged in pairs, one pair placed intermediate of each two of the holes 69. This plate will sow two hills of one kind of seed between two hills of another kind. For instance, it will drop one hill of corn, then two hills of beans, then one hill of corn, and so on.

Fig. 9 illustrates a style of dropping plate 71 for sowing two kinds of seed alternately but in a continuous row. It is provided with an outer series of slots 72 and an inner series of slots 73. While the outer slots are actually longer than the inner ones, they determine the same radial angle and will, therefore, sow the same length of the row. This plate, therefore, will sow continuously first a given length with one kind of seed, then the same length of the second kind of seed, then an equal length of the first kind of seed, and so on, the different kinds of seed being fed through the different series of slots. By varying the lengths of the slots in the two series so that their radial angles will be different, the plate will sow a longer space of one kind of seed than the other.

Referring again to Figs. 2 and 7, if one kind of seed is placed in the right hand compartment A and another in the left hand compartment B, the seed in A will fill the holes 62 of the outer series in the dropping plate 18, as said holes are exposed by the larger semi-circular slot in the cover plate while the seed in B will fill the holes 61 of the inner series in said dropping plate as they are exposed by the smaller slot in said cover plate. It will be noted that the holes of the inner series of the dropping plate will be protected from the contents of the compartment A by the cover plate and the holes of the outer series will be likewise protected from the contents of the compartment B. As said dropping plate is revolved the holes therein are filled with the seed from the compartments A and B and as they pass below the bridge the seed is swept off clean with the surface of the plate by the cut-offs. As each hole passes over the discharge opening in the base plate it is discharged of its load by the knock-out. It will be observed that the seed carried by one series of holes in the dropping plate will pass directly over the discharge opening in the base plate while the seed in the other series will have to first pass under the opposite end of the bridge and under the other compartment before it reaches the discharge opening.

I claim:

1. In a planter, a hopper and a revoluble dropping plate arranged therein, said plate having two series of seed-carrying perforations therein, the portions of said plate in which said perforations are formed being thicker than the rest of said plate and the portion in which one series of perforations is formed being thicker than that in which the other series is formed, for the purpose specified.

2. In a planter, a double hopper adapted to hold two kinds of seed, and means to alternately feed seed continuously to the same row including a revoluble dropping plate having two concentric series of arcuate slots therein, the slots of one series being arranged alternately with those of the other series.

3. In a planter, a double hopper adapted to hold two kinds of seed, and means to alternately feed said seed to the same row, including a revoluble dropping plate having two concentric series of perforations therein, the perforations of one series arranged alternately with the perforations of the other series.

4. In a planter, a hopper divided into two compartments, a revoluble dropping plate arranged in the bottom of said hopper and having two series of perforations therein, means to feed the seed from said compartments to said dropping plate and an ejector having two legs, each adapted to enter one of the series of perforations in said dropping plate.

5. In a planter, a hopper divided into two compartments, a revoluble dropping plate arranged in the bottom of said hopper and having two series of perforations therein, a slotted cover plate arranged above said dropping plate and an ejector having two legs each extending through one of the slots in said cover plate and adapted to enter one of the series of perforations in said dropping plate.

6. In a planter, a hopper divided into two compartments by a partition arranged vertically across the same, a revoluble dropping plate arranged in the bottom of said hopper and having two concentric series of perforations therein, a cover plate arranged above said dropping plate and having a semi-circular slot in each compartment adapted to feed the seed in said compartment to one of the series of perforations in the dropping plate, and means to eject the seed from said dropping plate.

7. In a planter, a hopper, a revoluble dropping plate arranged in the bottom thereof, and having two concentric series of perforations therein, a cover plate arranged above said dropping plate and having a semi-circular slot in each half thereof arranged in line with one of the series of slots in said dropping plate, a chambered bridge extending across said cover plate and covering the ends of said slots, and means arranged in the chamber of said bridge for discharging the seed which is fed to said dropping plate through the slots in the cover plate.

8. In a planter, a hopper, a revoluble dropping plate arranged in the bottom thereof and having two concentric series of perforations therein, a cover plate arranged above said dropping plate and having a semi-circular slot in each half thereof arranged in line with one of the series of slots in said dropping plate, a vertical partition across said hopper dividing it into two compartments, said partition having a chamber at its base covering the ends of said slots, and means arranged in said chamber for discharging the seed which is fed through the slots in the cover plate.

9. In a planter, a hopper, a revoluble dropping plate arranged in the bottom thereof and having two concentric series of perforations therein, a cover plate arranged above said dropping plate and having a semi-circular slot in each half thereof arranged in line with one of the series of slots in said dropping plate, a vertical partition arranged across said hopper dividing it into two compartments, said partition having a chamber at its base covering the ends of said slots, and a knock-out arranged in said chamber for discharging the seed which is fed through the slots in the cover plate.

10. In a planter, a hopper divided into two compartments by a partition arranged vertically across the same, a revoluble dropping plate arranged in the bottom of said hopper, a slotted cover plate arranged above said dropping plate whereby seed from each of said compartments is fed to said dropping plate, a yoke on said cover plate extending across one of the slots therein and serving as a brace and means of taking hold of said plate to remove it, and means to eject the seed from said dropping plate.

11. In a planter, a hopper, a revoluble dropping plate having two concentric series of perforations therein, and a gravity knock-out mounted astride a pin and having two legs, each adapted to discharge the seed from one series of perforations in said dropping plate.

12. In a planter, a hopper, a revoluble dropping plate arranged in the bottom thereof and having two concentric series of perforations therein, a cover plate arranged above said dropping plate and having a semi-circular slot in each half thereof arranged in line with one of the series of slots in said dropping plate, a vertical partition arranged across said hopper dividing it into two compartments, said partition having a chamber at its base covering the ends of said slots, and a gravity knock-out mounted in said chamber astride a pin and having two legs, each adapted to discharge the seed from one series of perforations in said dropping plate.

13. In a planter, a hopper, a revoluble dropping plate having two concentric series of perforations therein, a cover plate arranged above said dropping plate and having a semi-circular slot in each half thereof arranged in line with one of the series of slots in said dropping plate, a chambered bridge made of two similar parts having lugs engaging niches in said feeding plate, a cap fitting across said parts of said bridge and secured in place by a bolt engaging with said cover plate, and means in the chamber of said bridge to discharge the seed from said dropping plate.

14. In a planter, a hopper, a revoluble dropping plate having two concentric series of perforations therein, a cover plate arranged above said dropping plate and having a semi-circular slot in each half thereof arranged in line with one of the series of slots in said dropping plate, a chambered bridge extending across said cover plate and covering the ends of said slots, a seed ejector arranged in the chamber of said bridge, and cut-offs arranged at one end of each of the slots in the cover plate for the purpose specified.

15. In a planter, a hopper, a revoluble dropping plate having two concentric series of perforations therein, a cover plate arranged above said dropping plate and having a semi-circular slot in each half thereof arranged in line with one of the series of slots in said dropping plate, a chambered bridge extending across said cover plate and covering the ends of said slots, a seed ejector arranged in the chamber of said bridge, and adjustable cut-offs arranged at one end of each of the slots in the cover plate for the purpose specified.

16. In a planter, a hopper, a revoluble dropping plate having two concentric series of perforations therein, a cover plate arranged above said dropping plate and having a semi-circular slot in each half thereof arranged in line with one of the series of slots in said dropping plate, a chambered bridge extending across said cover plate and covering the ends of said slots, a seed ejector arranged in the chamber of said bridge and cut-offs arranged at one end of each of the slots in the cover plate for the purpose specified, each of said cut-offs having a brush at one end adapted to engage the dropping plate.

17. In a planter, a hopper, a revoluble dropping plate having two concentric series of perforations therein, a cover plate arranged above said dropping plate and having a semi-circular slot in each half thereof arranged in line with one of the series of slots in said dropping plate, a chambered bridge extending across said cover plate and covering the ends of said slots, a seed ejector arranged in the chamber of said bridge, and vertically adjustable cut-offs arranged at one end of each of said slots in the cover plate for the purpose specified, said bridge having guides for said cut-offs.

18. In a planter, a hopper, a revoluble dropping plate having two concentric series of perforations therein, a cover plate arranged above said dropping plate and having a semi-circular slot in each half thereof arranged in line with one of the series of slots in said dropping plate, a chambered bridge extending across said cover plate and covering the ends of said slots, a seed ejector arranged in the chamber of said bridge, cut-offs arranged at one end of each of said slots in the cover plate and back-fenders arranged at the other end of each of said slots for the purpose specified.

19. In a planter, a hopper, a revoluble dropping plate having two concentric series of perforations therein, a cover plate arranged above said dropping plate and having a semi-circular slot in each half thereof arranged in line with one of the series of slots in said dropping plate, a chambered bridge extending across said cover plate and covering the ends of said slots, a seed ejector arranged in the chamber of said bridge, vertically adjustable cut-offs and back-fenders arranged at the opposite ends of each of the slots in the cover plate, and guides on said bridge for said cut-offs and back-fenders.

20. In a planter, a hopper, a dropping plate in said hopper, a ring gear arranged outside of said dropping plate, means on said dropping plate and ring gear for locking them together against separate vertical displacement and means to revolve said ring gear.

21. In a planter, a hopper, a dropping plate in said hopper, said dropping plate having its edge beveled outwardly and downwardly, a ring gear arranged outside said dropping plate and having its inner edge correspondingly beveled inwardly and upwardly, means to lock said dropping plate and ring gear together, and means to revolve said ring gear.

22. In a planter, a hopper, a dropping plate in said hopper, said dropping plate having its edge beveled outwardly and downwardly, a ring gear arranged outside said dropping plate and having its inner edge correspondingly beveled inwardly and upwardly, said dropping plate having oppositely extending lugs at its edge, said lugs having their ends beveled in the opposite direction from the edge of said plate, the ring gear having notches to receive said lugs, the bases of said notches being beveled to correspond with the ends of the lugs in the opposite direction from the inner edge of said ring gear, one of said notches having a passage out therethrough for the purpose specified, and means to revolve said ring gear.

In testimony whereof, I affix my signature, in presence of two witnesses.

DAVID M. PEARCE.

Witnesses:
ANDREW J. HARPOLE,
LEID WADDELL.